United States Patent [19]
Chupp

[11] 3,903,162
[45] Sept. 2, 1975

[54] N-ANILINOMETHYLENEAMINOMETHYL-2-HALOACETANILIDES AND SALTS THEREOF
[75] Inventor: John P. Chupp, Kirkwood, Mo.
[73] Assignee: Monsanto Company, St. Louis, Mo.
[22] Filed: June 20, 1974
[21] Appl. No.: 481,093

[52] U.S. Cl. ...... 260/562 B; 260/562 A; 260/562 P
[51] Int. Cl.$^2$ .................................... C07C 103/34
[58] Field of Search.......... 260/562 A, 562 B, 562 P; 71/118

[56] References Cited
UNITED STATES PATENTS
3,557,210  1/1971  Hamm............................ 260/562 B
3,562,326  2/1971  Speziale et al. ................. 260/562 B Primary Examiner—C. Davis
Attorney, Agent, or Firm—William I. Andress

[57] ABSTRACT
N-anilinomethyleneaminomethyl-2-haloacetanilides and salts thereof are useful as herbicides.

20 Claims, No Drawings

N-ANILINOMETHYLENEAMINOMETHYL-2-HALOACETANILIDES AND SALTS THEREOF

This invention relates to N-anilinomethyleneaminomethyl-2-haloacetanilides of the formula

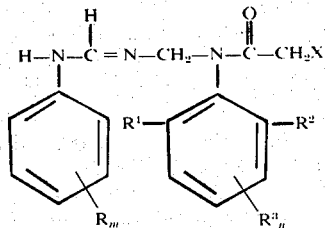

and their hydrochloride salts of the formula

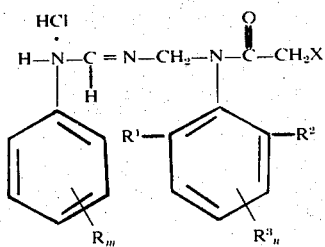

wherein each R is independently selected from the group consisting of lower alkyl, lower alkoxy, halo, trifluoromethyl and hydroxyl provided that no more than one R is hydroxyl, $R^1$ is lower alkyl, $R^2$ is hydrogen, primary lower alkyl or secondary lower alkyl, each $R^3$ is independently selected from the group consisting of lower alkyl, lower alkoxy, halo and trifluoromethyl, X is halo, preferably chloro, bromo, or iodo, more preferably chloro, $m$ is an integer from 0 to 3, and $n$ is an integer from 0 to 3, preferably 0.

As employed herein, the terms "lower alkyl" and "lower alkoxy" designate those groups wherein the aliphatic chain is straight or branched and has from 1 through 5 carbons, inclusive. The term "halo" designates a halogen atom selected from fluorine, chlorine, bromine and iodine.

The term "primary", when used with lower alkyl, designates that each carbon in the group is bonded to no more than two other carbons and the term "secondary", when used with lower alkyl, designates that one carbon in the group is bonded to three other carbons.

The compounds of this invention are conveniently and efficiently prepared by the reaction of an acetanilidoisocyanide with an aniline salt. Although the exact mechanism is not fully understood, it is postulated that the reaction proceeds according to the following chemical equation wherein R, $R^1$, $R^2$, $R^3$, X, $m$ and $n$ are as defined above. The hydrochloride salt is shown for illustrative purposes.

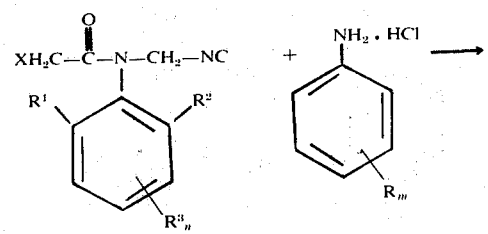

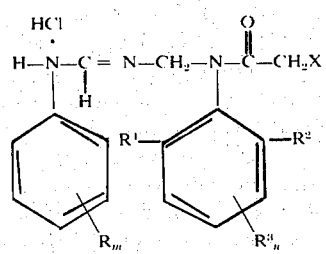

The conjugate base is then obtained by neutralizing the salt with aqueous ammonia.

The isocyanides and aniline salts are known compounds or are readily prepared by known methods from known compounds.

The reaction mass may consist only of the aforedescribed compounds and their reaction products or it may contain other components in addition such as diluents, other inert materials and solvents, i.e., common organic liquids which are inert under the reaction conditions and which may dissolve one or more of the reactants or products of the reaction, which solvents are exemplified by but not limited to chlorinated hydrocarbons, such as chloroform, methylene chloride, etc., aromatics such as benzene, toluene, xylenes, etc., ethers such as pressures ether, diisopropyl ether, petroleum ether, etc., esters such as methyl acetate, ethyl acetate, propyl acetate, etc., and other organics such as tetrahydrofuran, etc.

The reaction is normally carried out at a temperature above the freezing point of the system but preferably not above its boiling point. The reaction is most conveniently carried out at ambient room temperature. The reaction is usually carried out at atmospheric pressure, but higher or lower pressure may be utilized if equipment and other factors favor such higher or lower pressures. The reaction may be carried out in an open vessel or under reflux.

The compounds of this invention are useful as biocides. Exemplary of such biocidal uses for these products is the control of nematodes, arachnids, arthropods and insects as well as eradication of noxious weeds. These compounds are particularly useful as herbicides.

Pre-emergent and contact herbicidal compounds are useful in the selective killing of weeds in crops. In using the compounds of the present invention as pre-emergent and contact herbicides, the compounds can be used alone or in combination with a material referred to in the art as an adjuvant in liquid or solid form. Herbicidal formulations are prepared by admixing the compound which is the active ingredient of the formulation with an adjuvant including diluents, extenders, carriers and conditioning agents to provide compositions in the form of finely-divided particulate solids, granules, pellets, solutions, dispersions or emulsions. Thus, the active ingredient can be used with an adjuvant such as a finely-divided particulate solid, a liquid or organic origin, water, a wetting agent, dispersing agent, an emulsifying agent or any suitable combination of these. The herbicidal formulations usually contain from about 0.01 percent to about 99 percent by weight of the active ingredient. Application of these formulations to the soil or growth media can be carried out by simply admixing with the soil, by applying to the surface of the soil and thereafter dragging or discing into the soil to the desired depth, or by employing a liquid carrier to accomplish the penetration and impregnation. The application of liquid and particulate solid herbicidal formulations to the surface of soil or to above ground portions of plants can be carried out by conventional methods, e.g. power dusters, boom and hand sprayers and spray dusters. The formulations can also be applied from airplanes as a dust or a spray because of their effectiveness at low dosages. In a further method, the distribution of the active ingredients in soil can be carried out by admixture with the water employed to irrigate the soil. In such procedures, the amount of water can be varied with the porosity and water holding capacity of the soil to obtain the desired depth of distribution of the active ingredients.

The exact amount of active ingredient to be employed is dependent upon the response desired in the plant as well as such other factors as the plant species and stage of development thereof, the specific soil and depth at which the active ingredients are distributed in the soil and the amount of rainfall as well as the specific active ingredient employed. In foliar treatment, the active ingredients are applied in amounts from about 1 to about 50 or more pounds per acre. In applications to soil for the control of the growth of germinant seeds, germinative seeds, emerging seedlings and established vegetation, the active ingredients are applied in amounts from about 0.1 to about 25 or more pounds per acre. It is believed that one skilled in the art can readily determine from the teachings of this specification the general procedure for any application.

EXAMPLE 1

5.3 grams (g.) of 2-chloro-2',6'-diethyl-N-isocyanomethylacetanilide is placed in a suitable vessel and dissolved in 40 milliliters (ml.) of chloroform. 2.44 g. of ortho-fluoroaniline hydrochloride, which is prepared by dissolving the aniline in diethyl ether, adding HCl, filtering off the precipitate which forms and triturating with more diethyl ether, is added and the mass is refluxed for 1 hour. A small amount of solid which forms is removed by filtration. The filtrate is examined by infra-red spectral analysis to confirm the disappearance of the isocyanide band. The solvent is stripped under vacuum with final conditions of 70° Centigrade (C.) and 1 millimeter of mercury (mm$_{Hg}$) pressure. The residue is a glass and, when triturated with ethyl acetate, first dissolves and then precipitates as a solid. The precipitate is filtered, dried and recrystallized from isopropanol. The yield is 4.2 g. of a beige solid which is found to have a melting point of from 156° to 167°C. The solid is identified by nuclear magnetic resonance as 2-chloro-2',6'-diethyl-N-(ortho-fluoroanilino)methyleneaminomethylacetanilide hydrochloride.

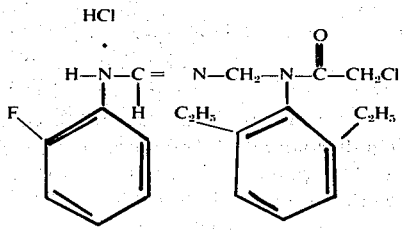

Calculated for $C_{20}H_{24}Cl_2FN_3O$: Cl, 17.20; N, 10.19. Found: Cl, 17.42; N, 10.30.

EXAMPLE 2

2.1 g. of the product of Example 1 is placed in a suitable vessel and dissolved in 20 ml. of dichloromethane. An equal volume of concentrated aqueous ammonia is added and the mass is stirred. The dichloromethane layer is separated from the aqueous layer and dried over anhydrous magnesium sulfate. The dichloromethane solution is filtered and the solvent is stripped off. The solid residue is recrystallized from isopropanol. The yield is 0.3 g. of a white solid which is found to have a melting point of from 91° to 102°C., to be soluble in acetone and to be insoluble in water. The solid is identified by nuclear magnetic resonance as 2-chloro-2',6'-diethyl-N-(ortho-fluoroanilino)methyleneaminomethylacetanilide.

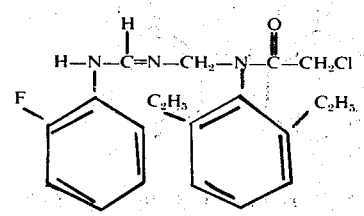

Calculated for $C_{20}H_{23}ClFN_3O$: C, 63.91; H, 6.17; N, 11.18. Found: C, 63.12; H, 6.03; N, 10.93.

EXAMPLE 3

2.64 g. of 2-chloro-2',6'-diethyl-N-isocyanomethylacetanilide is placed in a suitable vessel and dissolved in 15 ml. of chloroform. 2.0 g. of 3,4-dichloroaniline hydrochloride, which is prepared by dissolving the aniline in diethyl ether, adding HCl, filtering off the precipitate which forms and triturating with more diethyl ether, is added and the mass is refluxed for about 45 minutes. The reaction mass is examined by infra-red spectral analysis to confirm the disappearance of the isocyanide band. The solvent is stripped under vacuum with final conditions of 70° Centigrade (C.) and 1 millimeter of mercury (mm$_{Hg}$) pressure. The yellow residue is a glass and, when triturated with hot isopropanol, first dissolves and then precipitates as a solid. The precipitate is filtered, dried and recrystallized from isopropanol. The yield is 3.1 g. of a white solid which is found to have a melting point of from 154° to 156°C. The solid is identified by nuclear magnetic resonance as 2-chloro-N-(3,4-dichloroanilino)methyleneaminomethyl-2',6'-diethylacetanilide hydrochloride.

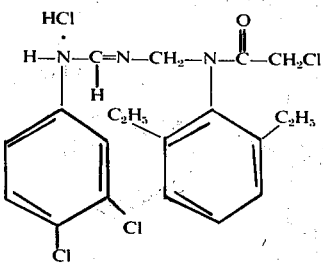

Calculated for $C_{20}H_{23}Cl_4N_3O$: C, 51.85; H, 5.00; N, 9.07. Found: C, 51.76; H, 4.98; N, 9.03.

EXAMPLE 4

1.0 g. of the product of Example 3 is placed in a suitable vessel with 20 ml. of dichloromethane. An equal volume of concentrated aqueous ammonia is added and the mass is stirred. The dichloromethane layer is separated from the aqueous layer, washed twice with water and dried over anhydrous magnesium sulfate. The dichloromethane solution is filtered and the solvent is stripped off. The solid residue is recrystallized from methylcyclohexane. The yield is 0.75 g. of a white solid which is found to have a melting point of 115°C., to be soluble in acetone and to be insoluble in water. The solid is identified by nuclear magnetic resonance as 2-chloro-N-(3,4-dichloroanilino)methyleneaminomethyl-2',6'-diethylacetanilide.

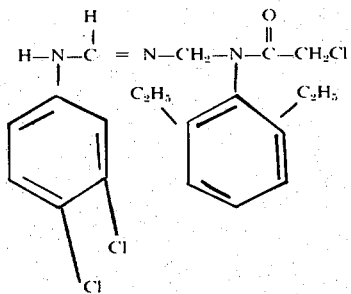

Calculated for $C_{20}H_{22}Cl_3N_3O$: C, 56.29; H, 5.20; N, 9.85. Found: C, 56.18; H, 5.17; N, 9.65.

EXAMPLE 5

2.64 g. of 2-chloro-2',6'-diethyl-N-isocyanomethylacetanilide is placed in a suitable vessel and dissolved in 15 ml. of chloroform. 1.3 g. of aniline hydrochloride, which is prepared by dissolving the aniline in diethyl ether, adding HCl, filtering off the precipitate which forms and triturating with more diethyl ether, is added and the mass is refluxed for about 30 minutes. The reaction mass is examined by infra-red spectral analysis to confirm the disappearance of the isocyanide band. The solvent is stripped under vacuum. The residue is recrystallized from ethyl acetate. The yield is 2.8 g. of a light yellow solid which is found to have a melting point of from 146° to 150°C.

The solid is identified by nuclear magentic resonance as N-anilinomethyleneaminomethyl-2-chloro-2',6'-diethylacetanilide hydrochloride.

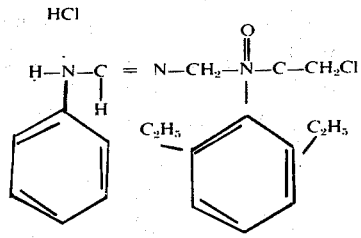

Calculated for $C_{20}H_{25}Cl_2N_3O$: C, 60.91; H, 6.39; Cl, 17.98; N, 10.66. Found: C, 60.66; H, 6.47; Cl, 18.29; N, 10.47.

EXAMPLE 6

5.7 g. of 2-chloro-2',6'-diethyl-N-isocyanomethylacetanilide is placed in a suitable vessel and dissolved in 40 ml. of chloroform. 4.7 g. of 2,5-dichloroaniline hydrochloride, which is prepared by dissolving the aniline in diethyl ether, adding HCl, filtering off the precipitate which forms and triturating with more diethyl ether and then air-drying, is added and the mass is refluxed for one hour. The reaction mass is examined by infra-red spectral analysis to confirm disappearance of the isocyanide band. A small amount of solid which forms is removed by filtration. The solvent is stripped from the filtrate under high vacuum. The residue is a glass and, when ethyl acetate is added, it slowly forms a solid. The precipitate is filtered, dried and recrystallized from isopropanol. The yield is 1.4 g. of a white solid which is found to have a melting point of from 160° to 170°C.

The solid is identified by nuclear magnetic resonance as 2-chloro-N-(2,5-dichloroanilino)methyleneaminomethyl-2',6'-diethylacetanilide hydrochloride.

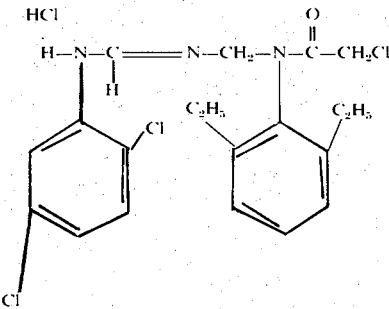

Calculated for $C_{20}H_{23}Cl_4N_3O$: C, 51.85; H, 5.00; Cl, 30.62; N, 9.07. Found: C, 51.49; H, 5.10; Cl, 30.75; N, 9.04.

EXAMPLE 7

0.85 g. of the product of Example 6 is placed in a suitable vessel and dissolved in 10 ml. of dichloromethane. An equal volume of concentrated aqueous ammonia is added and the mass is stirred. The dichloromethane layer is separated from the aqueous layer, washed with water and dried over anhydrous magnesium sulfate. The dichloromethane solution is filtered and the solvent is stripped off. The solid residue is recrystallized from methylcyclohexane. The yield is 0.4 g. of a white solid which is found to have a melting point of from 115° to 120°C., to be soluble in acetone and to be insoluble in water. The solid is identified by nuclear magnetic resonance as 2-chloro-N-(2,5-dichloroanilino)methyleneaminomethyl-2',6'-diethylacetanilide.

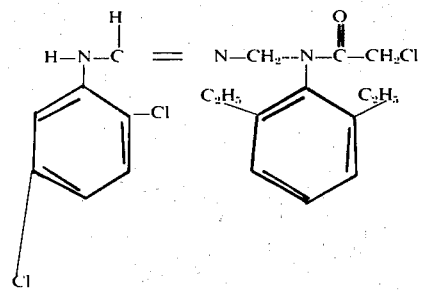

Calculated for $C_{20}H_{22}Cl_3N_3O$: C, 56.29; H, 5.20; N, 9.85. Found: C, 56.68; H, 4.94; N, 9.61.

EXAMPLE 8

5.3 g. of 2-chloro-2',6'-diethyl-N-isocyanomethylacetanilide is placed in a suitable vessel and dissolved in 40 to 50 ml. of dichloromethane. 3.2 g. of para-toluidine hydrochloride, which is prepared by dissolving the toluidine in diethyl ether, adding an excess of HCl and filtering off the precipitate, is added and the mass is refluxed for 2 hours. The reaction mass is examined by infra-red spectral analysis to confirm the disappearance of the isocyanide band. The mass is filtered to remove insoluble material. The solvent is stripped from the filtrate under vacuum. The residue is recrystallized from acetonitrile. The yield is 4.0 g. of a white powder which is found to have a melting point of from 174° to 175°C. The powder is identified by nuclear magnetic resonance as 2-chloro-2',6'-diethyl-N-(para-toluidino)methyleneaminomethylacetanilide hydrochloride.

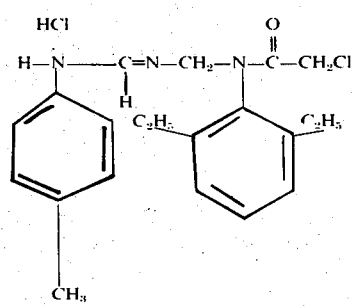

Calculated for $C_{21}H_{27}Cl_2N_3O$: C, 61.76; H, 6.66; N, 10.29. Found: C, 61.95; H, 6.63; N, 10.30.

EXAMPLE 9

5.3 g. of 2-chloro-2',6'-diethyl-N-isocyanomethylacetanilide is placed in a suitable vessel and dissolved in 40 to 50 ml. of dichloromethane. 3.2 g. of meta-toluidine hydrochloride, which is prepared by dissolving the toluidine in diethyl ether, adding an excess of HCl and filtering off the precipitate, is added and the mass is refluxed for one half hour. The reaction mass is examined by infra-red spectral analysis to confirm the disappearance of the isocyanide band. A small amount of solid which forms is removed by filtration. The solvent is stripped under vacuum. The residue is heated in ethyl acetate and, upon cooling, precipitates as a yellow powder. The precipitate is filtered, dried and recrystallized from a mixture of equal parts of butyl acetate and acetonitrile. The yield is 5.4 g. of an orange solid which is found to have a melting point of from 149° to 154°C. The solid is identified by nuclear magnetic resonance as 2-chloro-2',6'-diethyl-N-(metatoluidino)methyleneaminomethylacetanilide hydrochloride.

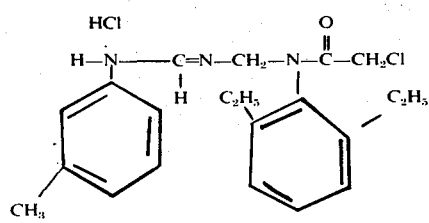

Calculated for $C_{21}H_{27}Cl_2N_3O$: C, 61.76; H, 6.66; N, 10.29. Found: C, 59.95; H, 6.53; N, 10.80.

EXAMPLE 10

5.3 g. of 2-chloro-2',6'-diethyl-N-isocyanomethylacetanilide is placed in a suitable vessel and dissolved in 40 to 50 ml. of dichloromethane. 3.2 g. of orthotoluidine hydrochloride, which is prepared by dissolving the toluidine in diethyl ether, adding an excess of HCl, and filtering off the precipitate, is added and the mass is refluxed for one hour. The reaction mass is examined by infra-red spectral analysis to confirm the disappearance of the isocyanide band. A small amount of solid which remains is removed by filtration. The solvent is stripped under vacuum. The residue is recrystallized from toluene. The yield is 5.1 g. of a white solid which is found to have a melting point of from 141° to 145°C. The solid is identified by nuclear magnetic resonance as 2-chloro-2',6'-diethyl-N-(ortho-toluidino)methyleneaminomethylacetanilide hydrochloride.

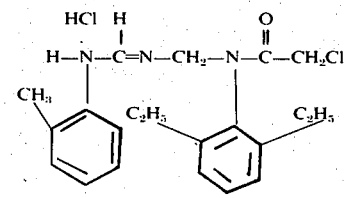

Calculated for $C_{21}H_{27}Cl_2N_3O$: C, 61.76; H, 6.66; N, 10.29. Found: C, 61.88; H, 6.67; N, 10.37.

EXAMPLE 11

5.3 g. of 2-chloro-2',6'-diethyl-N-isocyanomethylacetanilide is placed in a suitable vessel and dissolved in 40 to 50 ml. of dichloromethane. 3.43 g. of para-anisidine hydrochloride, which is prepared by dissolving the anisidine in diethyl ether, adding an excess of HCl, and filtering off the precipitate which forms, is added and the mass is refluxed for four hours. The filtrate is examined by infra-red spectral analysis to confirm the disappearance of the isocyanide band. A small amount of solid which remains is removed by filtration. The solvent is stripped under vacuum. The residue is recrystallized from toluene. The yield is 6.0 g. of a gray solid which is found to have a melting point of from 145° to 148°C. The solid is identified by nuclear magnetic resonance as 2chloro-2',6'-diethyl-N-(para-anisido)methyleneaminomethylacetanilide hydrochloride.

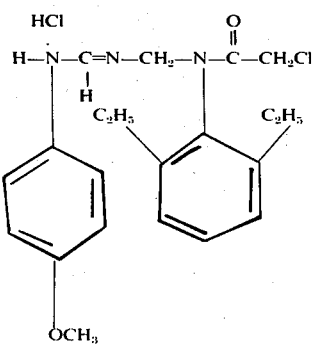

Calculated for $C_{21}H_{27}Cl_2N_3O_2$: C, 59.43; H, 6.41; N, 9.90. Found: C, 59.51; H, 6.44; N, 9.83.

EXAMPLE 12

5.3 g. of 2-chloro-2',6'diethyl-N-isocyanomethylacetanilide is placed in a suitable vessel and dissolved in 40 to 50 ml. of dichloromethane. 3.43 g. of ortho-anisidine hydrochloride, which is prepared by dissolving the anisidine in diethyl ether, adding HCl, and filtering off the precipitate which forms, is added and the mass is refluxed for one half hour. The filtrate is examined by infra-red spectral analysis to confirm the disappearance of the isocyanide band. A small amount of solid which remains is removed by filtration. The solvent is stripped under vacuum. The residue is recrystallized from toluene. The yield is 6.2 g. of a brown solid which is found to have a melting point of from 144° to 149°C. The solid is identified by nuclear magnetic resonance as 2-chloro-2',6'-diethyl-N-(ortho-anisidine)methyleneaminomethylacetanilide hydrochloride.

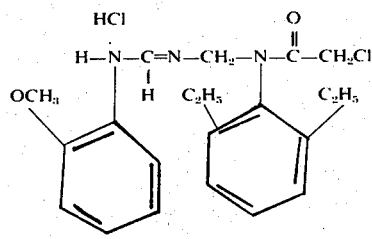

Calculated for $C_{21}H_{27}Cl_2N_3O_2$: C, 59.43; H, 6.41; N, 10.19. Found: C, 59.16; H, 6.46; N, 10.30.

EXAMPLE 13

5.3 g. of 2-chloro-2',6'diethyl-N-isocyanomethylacetanilide is placed in a suitable vessel and dissolved in 40 ml. of dichloromethane. 3.2 g. of meta-aminophenol hydrochloride, which is prepared by dissolving the phenol in tetrahydrofuran, adding HCl, and filtering off the precipitate which forms, is added and the mass is refluxed for one half hour. 75 ml. of chloroform is added and the mass is refluxed for an additional 3 ½ hours. The reaction mass is examined by infra-red spectral analysis to confirm the disappearance of the isocyanide band. A small amount of solid which remains is removed by filtration. The solvent is stripped under vacuum. The residue is taken up in acetonitrile, heated, allowed to cool and filtered. The solid is recrystallized first from isopropanol and then from water. The yield is 2.6 g. of a brown solid which is found to have a melting point of from 175° to 179°C. The solid is identified by nuclear magnetic resonance as 2-chloro-2',6'-diethyl-N-(meta-hydroxyanilino)methyleneaminomethylacetanilide hydrochloride.

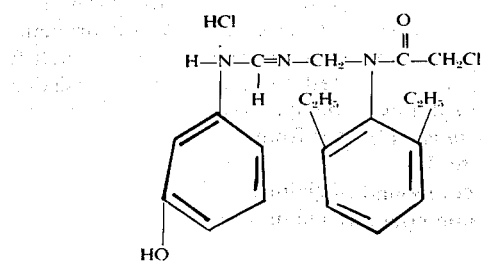

Calculated for $C_{20}H_{25}Cl_2N_3O_2$: C, 58.54; H, 6.14; N, 10.24. Found: C, 59.47; H, 6.29; N, 9.82.

EXAMPLES 14 THROUGH 22

Employing substantially the procedure of Example 12, the follwing compounds are similarly prepared from the appropriate raw materials:

| EXAMPLE NUMBER | |
|---|---|
| 14 | 2-iodo-2'-isopropyl-6'-methyl-N-(para-trifluoromethylanilino)methyleneaminomethylacetanilide hydrochloride |
| 15 | 2-bromo-N-(meta-iodoanilino)methyleneaminomethyl-2'-tertiary butyl-3',4',5'-trichloroacetanilide hydrochloride |
| 16 | 2-iodo-N-(para-bromoanilino)methyleneaminomethyl-2',4',6'-tripropylacetanilide hydrochloride |
| 17 | N-(2,3-diethyl-5-ethoxyanilino)methyleneaminomethyl-2-ethyl-2-bromo-5'-isopentyl-3'-trifluoromethylacetanilide hydrochloride |
| 18 | 2-chloro-2'-methyl-6'-neopentyl-4'-propoxy-N-(3,4,5-tri-isopropyl)methyleneaminomethylacetanilide hydrochloride |
| 19 | 4'-bromo-2',6'-diisopropyl-2-iodo-N-(paratertiary butylanilino)methyleneaminomethylacetanilide hydrochloride |
| 20 | 2-chloro-N-(meta-pentylanilino)methyleneaminomethyl-2',3',5',6'-tetramethylacetanilide hydrochloride |
| 21 | 2',3'-dimethyl-4'-fluoro-6'-pentyl-N-(2,4,6-trifluoroanilino)methyleneaminomethylacetanilide hydrochloride |
| 22 | 2-iodo-N-(para-pentoxyanilino)methyleneaminomethyl-2',3',6'-tri-isobutylacetanilide hydrochloride |

EXAMPLE 23

Employing substantially the procedure of Example 13 and utilizing the appropriate raw materials, 2-bromo-3'-ethoxy-5'-ethyl-2'-isopropyl-N-(para-hydroxyanilino)methyleneaminomethylacetanilide hydrochloride is similarly prepared.

The conjugate bases of the above salts are prepared by employing substantially the procedure of Example 2.

EXAMPLE 24

Pre-emergent herbical activity of representative compounds of this invention is determined by the following procedure:

A good grade of top soil is placed in aluminum pans and compacted to a depth of three eighths to one half inch from the top of the pan. A predetermined number of seeds of each of several plant species are placed on top of the soil in the pans. The seeds are covered with soil and the pans leveled. The herbicidal composition is applied by spraying the surface of the top layer of soil with a solution containing a sufficient amount of active ingredient to obtain the desired rate of application which is measured in terms of pounds per acre. The pans are then placed on a sand bench in the greenhouse and watered from below as needed. The plants are observed at the end of approximately 28 days and the results recorded.

The pre-emergent phytotoxic activity of the active ingredients is measured by the average percent control of each seed lot. The average percent control is converted to a relative numerical scale for the sake of brevity and simplicity in the examples. The pre-emergent phytotoxic activity index, as used in Table I, is defined as follows:

| Average Percent Control | | Numerical Scale |
|---|---|---|
| 0 – 25 | = | 0 |
| 26 – 50 | = | 1 |
| 51 – 75 | = | 2 |
| 76 – 100 | = | 3 |

The pre-emergent phytotoxic activity of some of the compounds of this invention are summarized in Table I. A dash (—) denotes that the species is not in the test.

TABLE I

| Compound of Example Number | 1 | 2 | 3 | 4 | 5 | 6 | 7 | 8 | 9 | 10 | 11 | 12 | 13 |
|---|---|---|---|---|---|---|---|---|---|---|---|---|---|
| Rate of Application (Lbs./Acre) | 1 | 5 | 1 | 1 | 1 | 5 | 1 | 5 | 5 | 5 | 5 | 5 | 5 |
| PLANT SPECIES: | | | | | | | | | | | | | |
| Canada thistle | 0 | 3 | 0 | 1 | 1 | 1 | 0 | 1 | 0 | 0 | 0 | 0 | 0 |
| Cocklebur | 0 | 0 | 0 | 0 | 1 | 0 | 0 | 0 | 0 | 0 | 0 | 0 | 0 |
| Velvetleaf | 2 | 1 | 0 | 0 | 0 | 0 | 0 | 1 | 0 | 0 | 0 | 0 | 0 |
| Morningglory | 1 | 1 | 0 | 0 | 1 | 2 | 0 | 0 | 0 | 0 | 0 | 1 | 0 |
| Lambsquarters | 1 | 3 | 2 | 2 | 2 | 3 | 1 | 2 | 2 | 1 | 2 | 2 | 3 |
| Smartweed | — | — | — | — | — | — | — | 0 | 3 | 1 | 0 | 3 | |
| Nutsedge | 0 | 3 | 2 | 1 | 3 | 3 | 0 | 2 | 2 | 0 | 1 | 1 | |
| Quackgrass | 1 | 2 | 1 | 3 | 2 | 2 | 0 | 0 | 2 | 0 | 1 | 3 | |
| Johnsongrass | 0 | 1 | 1 | 1 | 1 | 3 | 0 | 0 | 0 | 0 | 0 | 0 | |
| Brome | 3 | 2 | 1 | 2 | 3 | 1 | 0 | 3 | 3 | 3 | 1 | 1 | |
| Barnyard Grass | 3 | 3 | 3 | 3 | 3 | 3 | 3 | 3 | 3 | 3 | 3 | 3 | 3 |

EXAMPLE 25

Contact herbicidal activity of representative compounds of this invention is determined by the following procedure:

The compound to be tested is applied in spray form to plants of a given age of several grasses and broadleaf species. After the plants are the desired age, each aluminum pan of plants is sprayed with a given volume of a solution of the desired percent concentration of the candidate chemical. This solution is prepared from an aliquot of a 2 percent solution of the candidate compound in acetone, a known amount of cyclohexanone-emulsifying agent mix, and sufficient water to make up to volume. The emulsifying agent is a mixture comprising 35 wt. percent of a tall oil-ethyleneoxide condensate having about 6 moles of ethylene oxide per mole of tall oil. The injuries to the plants are then observed approximately 14 days later and the results are recorded. The herbicidal rating is obtained by means of a fixed scale based on the average percent germination of each seed lot. The herbicidal ratings are defined as follows:

```
0 — No phytotoxicity.
1 — Slight phytotoxicity.
2 — Moderate phytotoxicity.
3 — Severe phytotoxicity.
4 — Plants all dead.
- — Not tested.
```

Individual injury ratings for each plant type are reported in Table II.

A herbicidal solution concentration of 0.2 percent is substantially equivalent to an application rate of 4 pounds per acre.

TABLE II

| Compound of Example Number | 3 | 4 |
|---|---|---|
| Rate of Application (Lbs./Acre) | 4 | 4 |
| PLANT SPECIES: | | |
| Canada thistle | — | — |
| Cocklebur | 0 | 0 |
| Velvetleaf | 0 | 1 |
| Morningglory | 0 | 0 |
| Lambsquarters | 3 | 2 |
| Nutsedge | 0 | 0 |
| Smartweed | — | — |
| Quackgrass | 0 | 1 |
| Johnsongrass | 1 | 0 |
| Brome | 2 | 2 |
| Barnyard Grass | 0 | 0 |

While this invention has been described with respect to certain embodiments, it is to be understood that it is not so limited and that variations and modifications thereof obvious to those skilled in the art to which this invention appertains can be made without departing from the spirit or scope thereof.

What is claimed is:

1. A compound selected from the group consisting of an N-anilinomethyleneaminomethyl-2-haloacetanilide of the formula

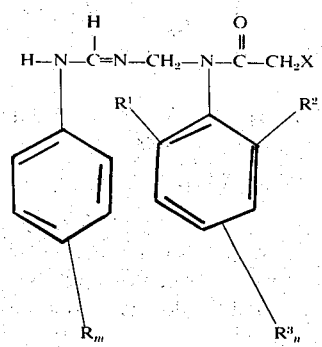

and a hydrochloride salt of the formula

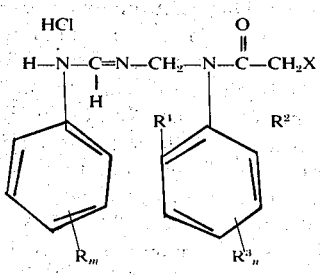

wherein each R is independently selected from the group consisting of lower alkyl, lower alkoxy, halo, trifluoromethyl and hydroxyl provided that no more than one R is hydroxyl, $R^1$ is lower alkyl, $R^2$ is hydrogen, primary lower alkyl or secondary lower alkyl, each $R^3$ is independently selected from the group consisting of lower alkyl, lower alkoxy, halo and trifluoromethyl, X is halo, $m$ is an integer from 0 to 3, and $n$ is an integer from 0 to 3.

2. A compound of claim 1 wherein X is chloro.

3. A compound of claim 1 wherein $n$ is 0.

4. A compound of claim 1 wherein $R^1$ and $R^2$ are like alkyl.

5. A compound of claim 4 wherein $m$ is an integer of from 0 to 2.

6. A compound of claim 5 wherein $R^1$ and $R^2$ are each ethyl.

7. A compound of claim 6 wherein X is chloro.

8. A compound of claim 7 wherein $n$ is 0.

9. The compound of claim 8 wherein $m$ is 0.

10. A compound of claim 8 wherein $m$ is 2 and R is halo.

11. A compound of claim 10 wherein R is chloro.

12. A compound of claim 8 wherein $m$ is 1.

13. A compound of claim 12 wherein R is methoxy.

14. A compound of claim 12 wherein R is methyl.

15. A compound of claim 12 wherein R is hydroxyl.

16. A compound of claim 12 wherein R is halo.

17. A compound of claim 1 wherein $R^2$ is hydrogen.

18. A compound of claim 10 wherein $R^1$ is tertiary lower alkyl.

19. A compound of claim 1 which is a hydrochloride salt.

20. A compound of claim 1 which is an N-anilinomethyleneaminomethyl-2-haloacetanilide.

* * * * *

UNITED STATES PATENT OFFICE
CERTIFICATE OF CORRECTION

PATENT NO. : 3,903,162
DATED : September 2, 1975
INVENTOR(S) : John P. Chupp

It is certified that error appears in the above–identified patent and that said Letters Patent are hereby corrected as shown below:

Column 10, Example Number 17, second line of chemical name which reads "ethoxyanilino)methyleneaminomethyl-2-ethyl-2-" should read -- ethoxyanilino)methyleneaminomethyl-2'-ethyl-2- --.

Column 11, Table I, the last 4 columns of data which reads

" 10  11  12  13 " should read -- 10  12  13 --.

| 5 | 5 | 5 | | 5 | 5 | 5 |
|---|---|---|---|---|---|---|
| 0 | 0 | 0 | | 0 | 0 | 0 |
| 0 | 0 | 0 | | 0 | 0 | 0 |
| 0 | 0 | 0 | | 0 | 0 | 0 |
| 0 | 1 | 0 | | 0 | 1 | 0 |
| 1 | 2 | 3 | | 1 | 2 | 3 |
| 1 | 0 | 3 | | 1 | 0 | 3 |
| 0 | 1 | 1 | | 0 | 1 | 1 |
| 0 | 1 | 3 | | 0 | 1 | 3 |
| 0 | 0 | 0 | | 0 | 0 | 0 |
| 3 | 1 | 1 | | 3 | 1 | 1 |
| 3 | 3 | 3 | | 3 | 3 | 3 |

UNITED STATES PATENT OFFICE
CERTIFICATE OF CORRECTION

PATENT NO. : 3,903,162
DATED : September 2, 1975
INVENTOR(S) : John P. Chupp

It is certified that error appears in the above-identified patent and that said Letters Patent are hereby corrected as shown below:

Column 12, Claim 1, Lines 47-55, the formula which reads

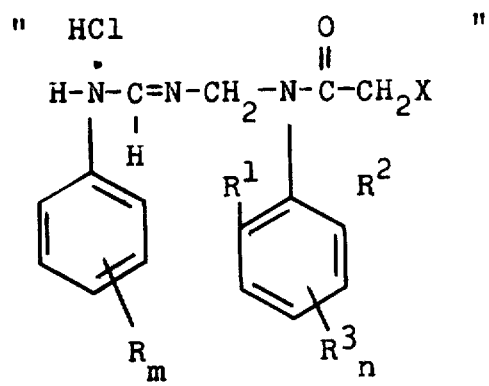   should read -- 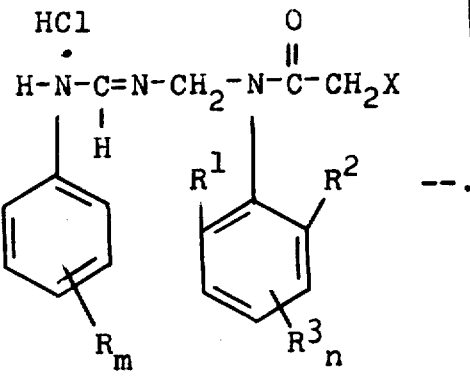 --.

Signed and Sealed this

Twelfth Day of April 1977

[SEAL]

Attest:

RUTH C. MASON
Attesting Officer

C. MARSHALL DANN
Commissioner of Patents and Trademarks